(12) United States Patent
Lenti et al.

(10) Patent No.: US 12,163,742 B2
(45) Date of Patent: Dec. 10, 2024

(54) HEAT EXCHANGER MODULE AND A DIE COMPRISING A PLURALITY OF MODULES

(71) Applicant: PAVAN S.p.A., Galliera Veneta (IT)

(72) Inventors: Massimo Lenti, Savigliano (IT);
Giorgio Tesser, Montebelluna (IT);
Nicola Favero, Montebelluna (IT)

(73) Assignee: PAVAN S.p.A., Galliera Veneta (IT)

( * ) Notice: Subject to any disclaimer, the term of this patent is extended or adjusted under 35 U.S.C. 154(b) by 0 days.

(21) Appl. No.: 18/696,706

(22) PCT Filed: Jul. 28, 2023

(86) PCT No.: PCT/IB2023/057702
§ 371 (c)(1),
(2) Date: Mar. 28, 2024

(87) PCT Pub. No.: WO2024/089480
PCT Pub. Date: May 2, 2024

(65) Prior Publication Data
US 2024/0263886 A1    Aug. 8, 2024

(30) Foreign Application Priority Data
Oct. 24, 2022   (EP) .................................... 22203177

(51) Int. Cl.
*F28D 7/02*    (2006.01)
*F28D 9/00*    (2006.01)
*F28D 21/00*   (2006.01)
*F28F 3/14*    (2006.01)

(52) U.S. Cl.
CPC ........... *F28D 9/0068* (2013.01); *F28D 21/00* (2013.01); *F28F 3/14* (2013.01); *F28D 2021/0042* (2013.01)

(58) Field of Classification Search
CPC ................... F28D 9/0068; F28D 21/00; F28D 2021/0042; F28F 3/14
USPC ........................................................ 165/165
See application file for complete search history.

(56) References Cited

FOREIGN PATENT DOCUMENTS

| CN | 101886885 A | 11/2010 |
|---|---|---|
| EP | 2737272 B1 | 11/2018 |
| KR | 100533694 B1 * | 12/2005 |
| WO | WO 2000/007929 A1 | 2/2000 |
| WO | WO 2013/015944 A2 | 1/2013 |
| WO | WO 2013/015944 A3 | 1/2013 |

OTHER PUBLICATIONS

International Search Report and Written Opinion issued for PCT/IB2023/057702 (ISA/EP) mailed Sep. 15, 2023 (7 pages).

* cited by examiner

*Primary Examiner* — Davis D Hwu
(74) *Attorney, Agent, or Firm* — ALTON & BIRD LLP

(57) ABSTRACT

A heat exchanger module (1) comprising:
two plates (2a, 2b) that are arranged in parallel and spaced from each other by means of two spacing elements (3a, 3b) so as to define a channel (4) for the passage of a fluid product, the channel (4) being delimited by the plates (2a, 2b) and the spacing elements (3a, 3b);
two concave shells (5a, 5b), each of the plates (2a, 2b) being integrally fixed to one of the concave shells (5a, 5b);
at least one passage (P) for a heat transfer fluid, the passage (P) being defined in a pocket (15) between one of the plates (2a, 2b) and the corresponding concave shell (Sa, 5b), the passage (P) being defined by one or more diverters (18) arranged within the pocket (15).

19 Claims, 15 Drawing Sheets

HEAT EXCHANGER MODULE AND A DIE COMPRISING A PLURALITY OF MODULES

CROSS REFERENCE TO RELATED APPLICATIONS

This application is a National Stage Application, filed under 35 U.S.C. § 371, of International Application No. PCT/IB2023/057702, filed Jul. 28, 2023, which claims priority to European Patent Application No. 22203177.5, filed Oct. 24, 2022; the contents of both of which are hereby incorporated by reference in their entirety.

BACKGROUND

Related Field

The present invention relates to a heat exchanger module and to a die comprising a plurality of modules.

The invention finds application in treating food products, either for humans or for animals.

In particular, the fluid product can be an emulsion from which high moisture meat analogs can be obtained, which resemble chunks or pieces of natural meat in appearance, texture, and physical structure.

In recent years there has increased a demand for meat analogs, that are used as a partial or complete replacement for more expensive natural meat chunks in food products, in particular in pet food products. Meat analogs provide indeed a more economical product that attempts to simulate natural meat chunks in shape, appearance, and texture.

In the claimed invention, the fluid product can also be a milk derivative.

In particular, the die finds application in cooling edible products either for humans or for animals.

The invention finds application also in the production of nano-structured, carbon-based material, in particular graphene and carbon nanotubes.

The invention may be applied also in the construction industry, in particular for treating composite materials of plastics and woods.

The invention can also be used for treating concrete and ceramics.

Description of Related Art

Solutions are already known in the market of dies for obtaining edible products for pets.

From EP 2 737 272 B1 it is known a device for heating or cooling viscous materials for producing food products from meat emulsions, according to the preamble of claim 1.

One of the main issues is achieving a good control of the thermal treatment of the product while passing through the inner channel.

Due to viscosity the product can spread and penetrate in openings between the components, where it can even solidify.

This requires dismantling the die or at least some of the components, to get the cleaned. Cleaning operations are particularly critical in the food industry, where attention shall be posed to proliferation of bacteria and molds.

It is felt the need to obtain meat analogs that maintain their shape, appearance, and texture when subjected to commercial canning and retorting procedures.

Brief Summary

In this context, the technical task at the basis of the present invention is to propose a heat exchanger module and a die, which overcome the above-mentioned drawbacks of the prior art.

In particular, the object of the present invention is to propose a heat exchanger module, in particular in the treatment of fluid products, which achieves an enhanced thermal treatment control of the products, so resulting in higher quality final products.

Another object of the present invention is to propose a heat exchanger module and a die, in particular in the treatment of fluid products, that are easily adaptable to diverse types of products.

The stated technical task and specified objects are substantially achieved by a heat exchanger module comprising:
   two plates that are arranged in parallel and spaced from each other by means of two spacing elements so as to define a channel for the passage of a fluid product, the channel being delimited by the plates and the spacing elements,
   two concave shells, each of the plates being integrally fixed to one of the concave shells,
   characterized in that it comprises at least one passage for a heat transfer fluid, the passage being defined in a pocket between one of the plates and the corresponding concave shell, the passage being defined by one or more diverters arranged within the pocket. According to one aspect of the invention, the pocket is obtained in one of the plates that comprises an outer surface towards the respective concave shell. The outer surface has an inward recess that creates the pocket.

Thee one or more diverters are protrusions emerging from the outer surface so as to define the passage.

According to one embodiment of the invention, the protrusions have a substantially linear development.

Preferably, the protrusions are mutually parallel.

For example, the protrusions are staggered across the pocket.

According to another embodiment of the invention, the passage has a wavy development or labyrinth so as to increase turbulence in the heat transfer fluid.

According to another embodiment of the invention, each of the protrusions has a substantially linear development or a curvilinear development or a polylinear development.

According to another embodiment of the invention, the heat exchanger module comprises two passages obtained in the same plate and separated by a single protrusion developing along the whole length of the pocket.

According to another embodiment of the invention, the passage is only one and is delimited by two protrusions developing along the whole length of the pocket.

According to one aspect of the invention, each of the plates has at least one passage for a heat transfer fluid.

In particular, the passages of the plates are identical or different.

According to one aspect of the invention, the spacing elements have corresponding inner surfaces delimiting the channel.

In one embodiment, the inner surfaces of the spacing elements are plane and mutually parallel.

In another embodiment, the inner surfaces of the spacing elements have a concavity C that extends along their development following the development of the channel.

In another embodiment, the inner surfaces of the spacing elements are diverging with respect to each other so that the channel has a tapered development from an inlet to an outlet.

According to one aspect of the invention, the heat exchanger module further comprises a perforating gun that is created so as to cross a half of the heat exchanger module and emerging into the channel.

According to one aspect of the invention, the heat exchanger module further comprises a plurality of threaded holes for allowing the insertion of screws or other tools in disassembling the heat exchanger module.

According to one aspect of the invention, the heat exchanger module further comprises a plurality of flanges that are applied externally to the concave shells and integrally fixed thereto.

The stated technical task and specified objects are substantially achieved by a die for edible products for animals or humans, comprising a plurality of heat exchanger modules according to the claimed invention.

The heat exchangers modules are connected in series so that their channels are in fluid communication. In particular, the flanges of adjacent modules are connected together.

According to one embodiment of the invention, each of the channel is tapered or with a constant-cross section.

BRIEF DESCRIPTION OF THE FIGURES

Further characteristics and advantages of the present invention will more fully emerge from the non-limiting description of a preferred but not exclusive embodiment of a heat exchanger module and a die comprising a plurality of modules, as depicted in the attached figures.

DETAILED DESCRIPTION OF VARIOUS EMBODIMENTS

Figure 1:
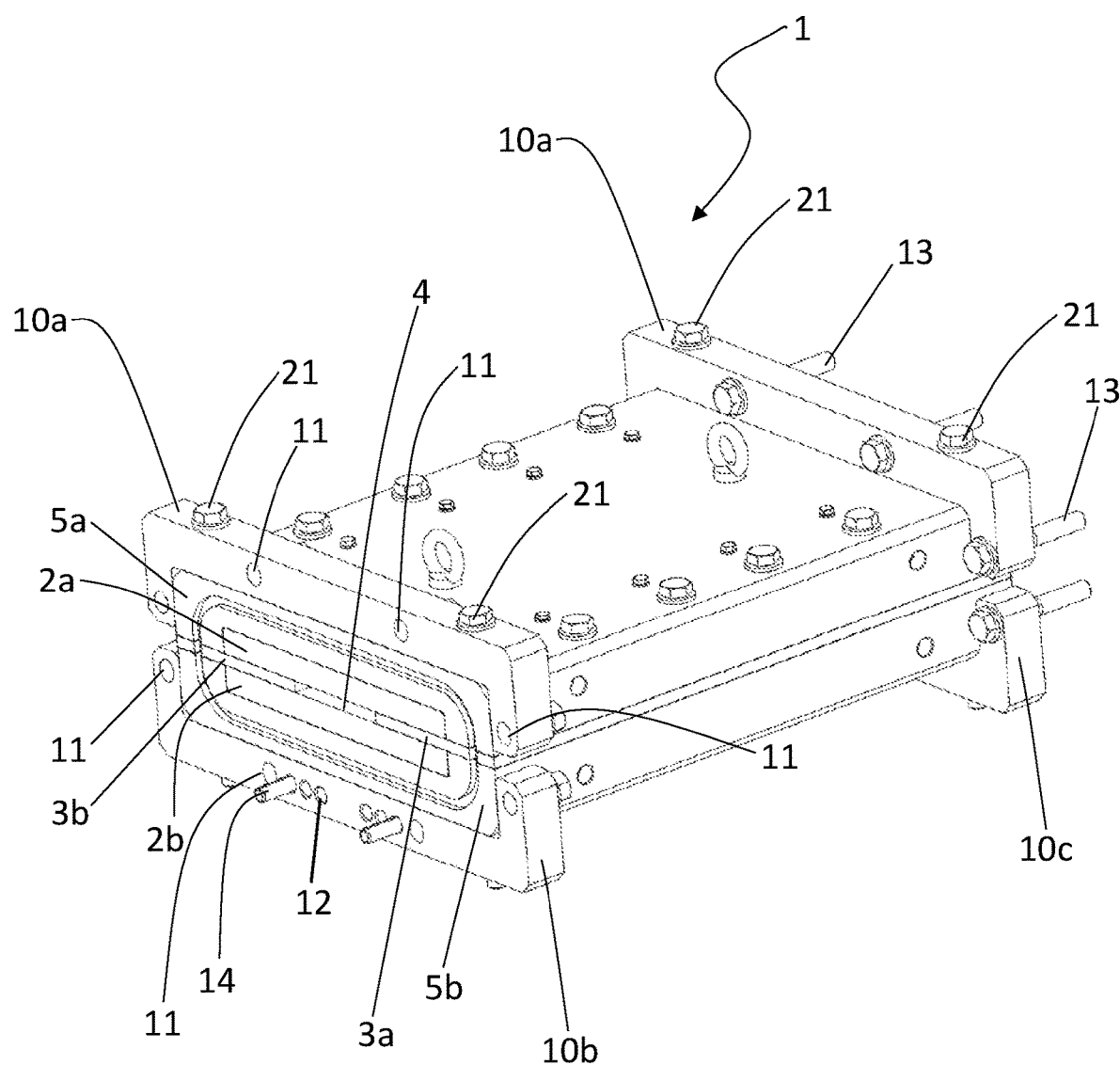
FIG. 1 illustrates a heat exchanger module, according to the present invention, in a perspective view.
Figure 2:
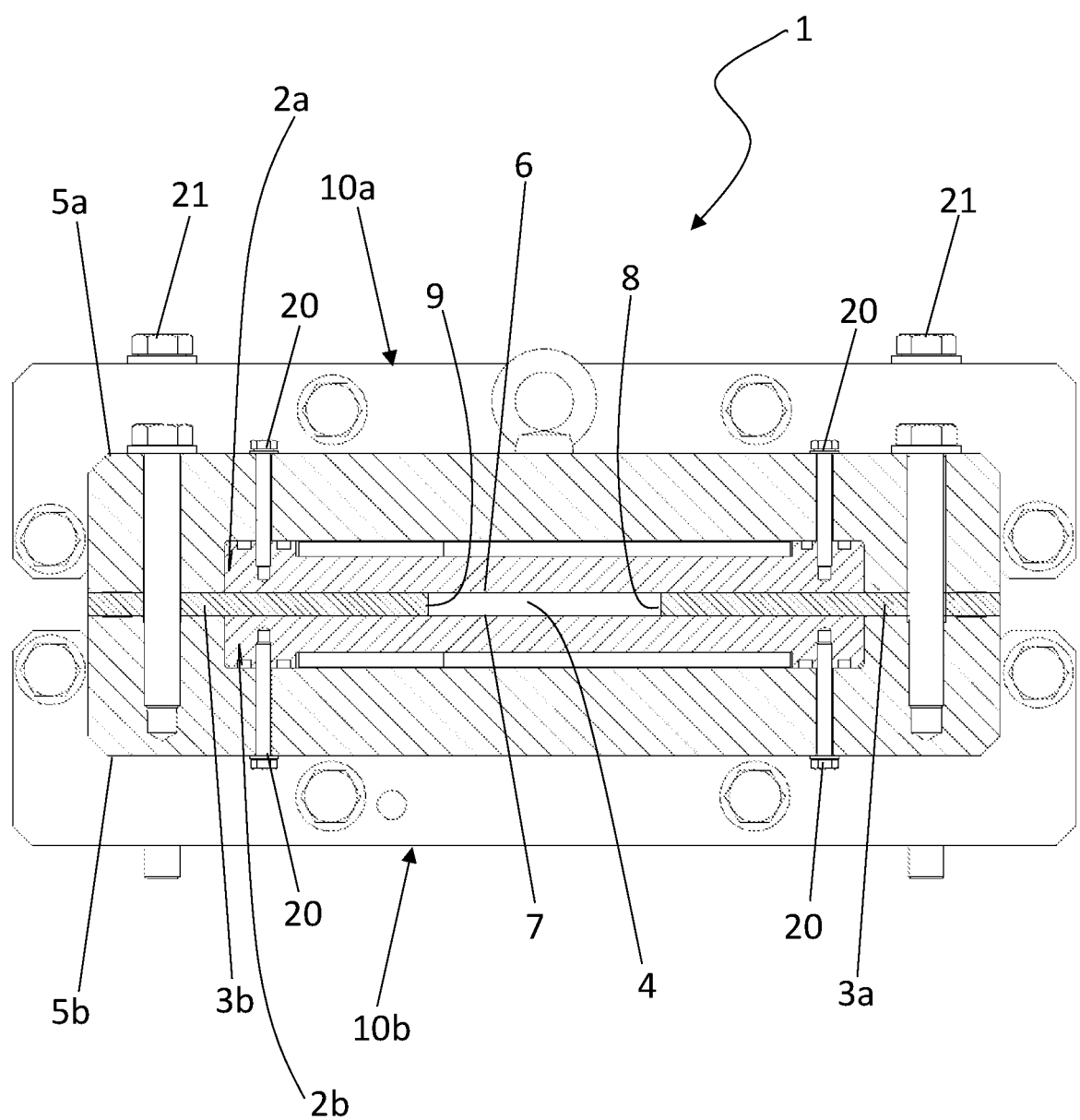
FIGS. 2 and 3 illustrate different embodiments of the heat exchanger of FIG. 1, in a transverse cross-section.
Figure 3:
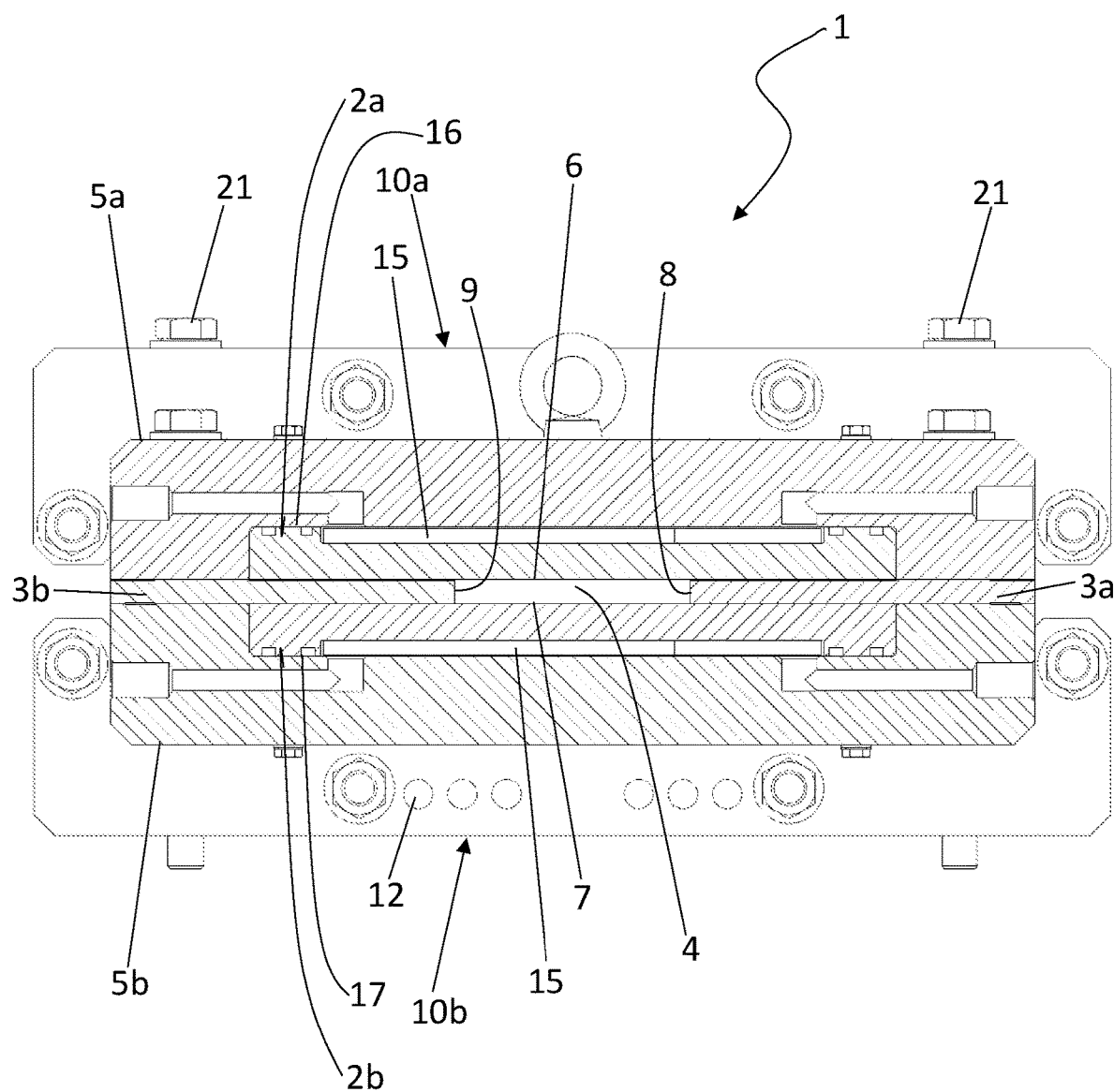

With reference to the figures, number 1 is relative to a heat exchanger module comprising two plates 2 that are arranged in parallel and spaced from each other.

In this context, the two plates will also be referred to as "upper plate", indicated with 2a, and "lower plate" indicated with 2b.

In particular, the plates 2a, 2b are spaced by means of two spacing elements 3a, 3b so as to define a channel 4 for the passage of a fluid or viscous product.

For example, the fluid product is a food product, either for humans or for animals. In particular, the fluid product can be an emulsion from which high moisture meat analogs can be obtained.

The fluid product can also be a milk derivative.

In other applications, the fluid product is a nano-structured, carbon-based material, in particular graphene and carbon nanotubes.

In other applications, the fluid product is a composite material of plastics and woods.

In other application, the fluid product is a composition of concrete or ceramics.

The channel 4 is delimited by the plates 2a, 2b and the spacing elements 3a, 3b.

Each plate 2a, 2b is integrally fixed to a corresponding concave shell 5a, 5b.

In particular, each concave shell 5a, 5b has a recess for housing one of the plates 2a, 2b.

In this context, the concave shells 5a, 5b will be addressed as:

upper concave shell 5a, to which the upper plate 2a is integrally fixed;

lower concave shell 5b, to which the lower plate 2b is integrally fixed.

According to one aspect of the invention, each plate 2a, 2b is fixed to the corresponding concave shell 5a, 5b by means of screws 20.

The spacing elements 3a, 3b are partially interposed between the two plates 2a, 2b.

In particular each spacing element 3a, 3b has a portion extending and constrained between the two plates 2a, 2b and another portion that protrudes out of the plates 2a, 2b, whereas it is constrained between the two concave shells 5a, 5b.

With reference to the plates 2a, 2b, in this context the spacing elements 3a, 3b will be here referred to as "right spacing element", indicated with 3a, and "left spacing element", indicated with 3b.

In particular, the channel 4 is delimited by:

an inner surface 6 of the upper plate 2a;

an inner surface 7 of the lower plate 2b;

an inner surface 8 of the right spacing element 3a;

an inner surface 9 of the left spacing element 3b.

The channel 4 has an inlet for the fluid product that is indicated with "IN", and outlet for the fluid product that is indicated with "OUT".

The heat exchanger module 1 further comprises a plurality of flanges 10a, 10b that are operatively active externally to the concave shells 5a, 5b and integrally fixed thereto.

In particular, the flanges 10a, 10b are fixed to the concave shells 5a, 5b by means of screws 21.

According to the illustrated embodiments, each heat exchanger module 1 has four flanges 10a, 10b, 10c arranged as explained hereafter.

Two flanges 10a, that are called here "upper flanges", are applied respectively on two opposite ends of the upper concave shell 5a.

One of the upper flanges 10a is applied at the inlet IN of the channel 4, the other upper flange 10a is applied at the outlet OUT of the channel 4.

Two flanges 10b, 10c that are called here "lower flanges", are applied respectively on two opposite ends of the lower concave shell 5b.

One of the lower flanges 10b is applied at the inlet IN of the channel 4, whereas the other lower flange 10c is applied at the outlet OUT of the channel 4. From the description above it is clear that the heat exchanger module 1 (shortly "module") comprises two halves that are:

an upper half comprising the upper plate 2a, the upper concave shell 5a and the upper flanges 10a;

a lower half comprising the lower plate 2b, the lower concave shell 5b and the lower flanges 10b, 10c.

Between the upper half and the lower half of the module 1 there are arranged the two spacing elements 3a, 3b and the channel 4.

According to one aspect of the invention, each flange 10a, 10b, 10c comprises through-holes 11, 12 wherein pins or screws 13, 14 can pass through.

This allows to connect two heat exchanger modules 1 together by bringing close two end flanges of one module 1 to two end flanges of the other module 1.

For example, the two end flanges 10a, 10b applied to the inlet IN of one module 1 are brought close to the two end flanges 10a, 10c applied to the outlet OUT of the other module 1.

Thus, the through-holes 11, 12 of the flanges 10a, 10b, 10c of the two modules 1 are aligned so that pins/screws 13, 14 may be inserted to join them.

This will be explained better below.

According to one aspect of the invention, the through-holes 11, 12 are of two types:

a first series of through-holes 11 allowing the insertion of screws 13 for connecting modules 1 together;

a second series of through-holes 12 allowing the insertion of pins 14 that are used for maintaining the alignment of the modules 1.

In particular, the coupling of the through-holes 11 of the first series with the screws 13 allows the structural connections of modules 1.

The coupling of the through-holes 12 of the second series with the pins 14 allows to reciprocally position the modules 1, achieving a high precision of alignment.

Modules 1 of different length may be connected together by means of these corresponding flanges 10a, 10b, 10c.

Modules 1 of different width can also be connected together, provided the flanges 10a, 10b, 10c are adapted in shape and/or size for allowing their interfacing.

According to one aspect of the invention, the lower flanges 10b, 10c are different. In particular, they show a different arrangement of the through-holes 12 of the second series.

Figure 4:
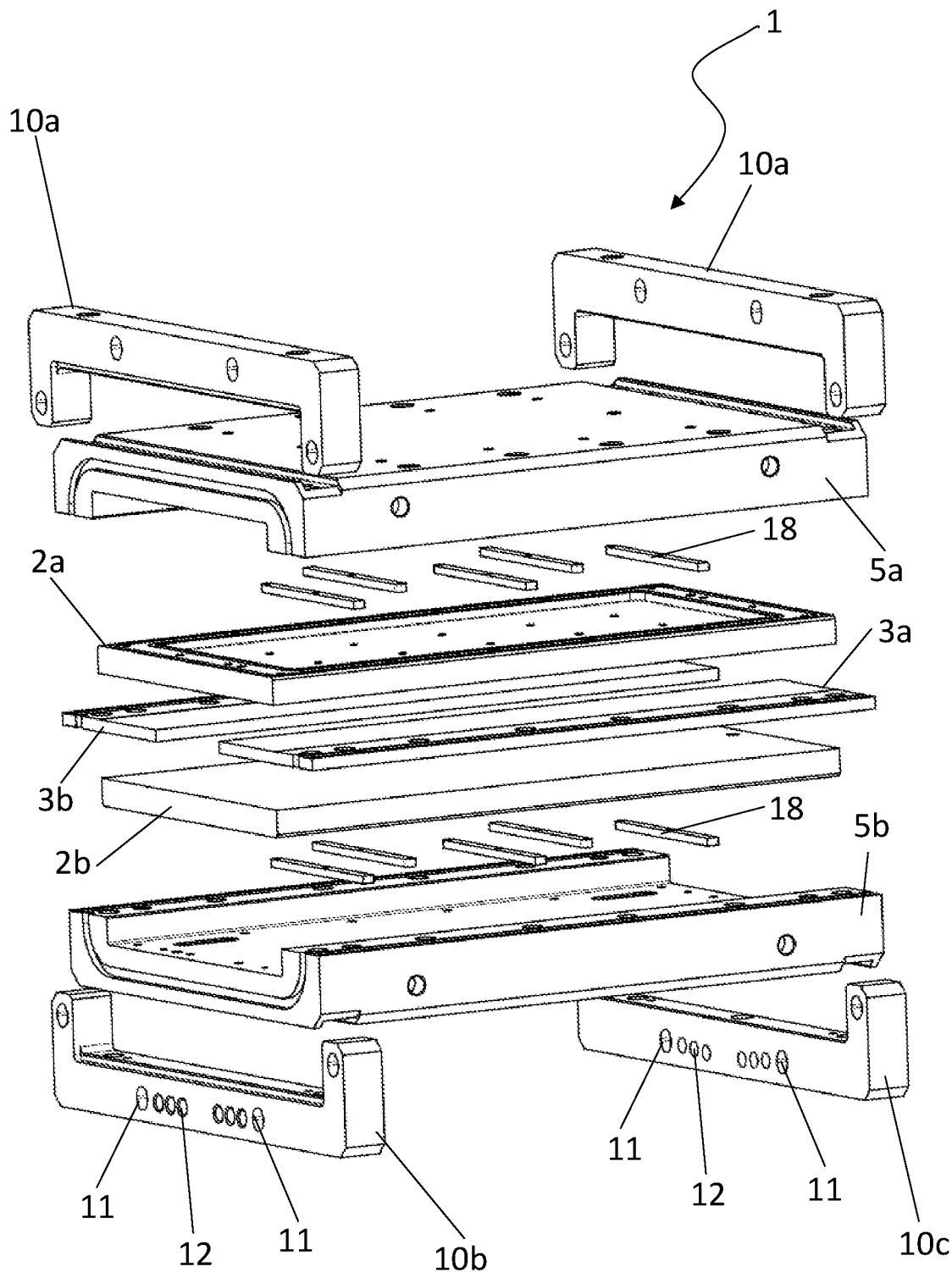
FIG. 4 is an exploded view of the heat exchanger module of FIG. 1.

This is shown in FIG. 4.

In particular, in one of the lower flanges, that is 10b, the through-holes 12 of the second series are all aligned, despite they are arranged in two groups. Preferably, the centers of these through-holes 12 lie on a common horizontal line.

In the other of the lower flanges, that is 10c, the through-holes 12 of the second series are arranged in two different groups of differently aligned holes. Preferably, the through-holes 12 of one group are aligned with their centers lying on a first axis and the through-holes 12 of the other group are aligned with their centers lying on a second axis. The first axis and the second axis are inclined, e.g., not parallel.

Having lower flanges 10b, 10c that are different (with different arrangements of the through-holes 12 of the second series) allows to connect modules 1 with different height.

According to one aspect of the invention, the two spacing elements 3a, 3b are identical in shape and dimensions.

According to one embodiment of the invention, the inner surface 8 of the right spacing element 3a and the inner surface 9 of the left spacing element 3b are plane and mutually parallel.

Figure 11:
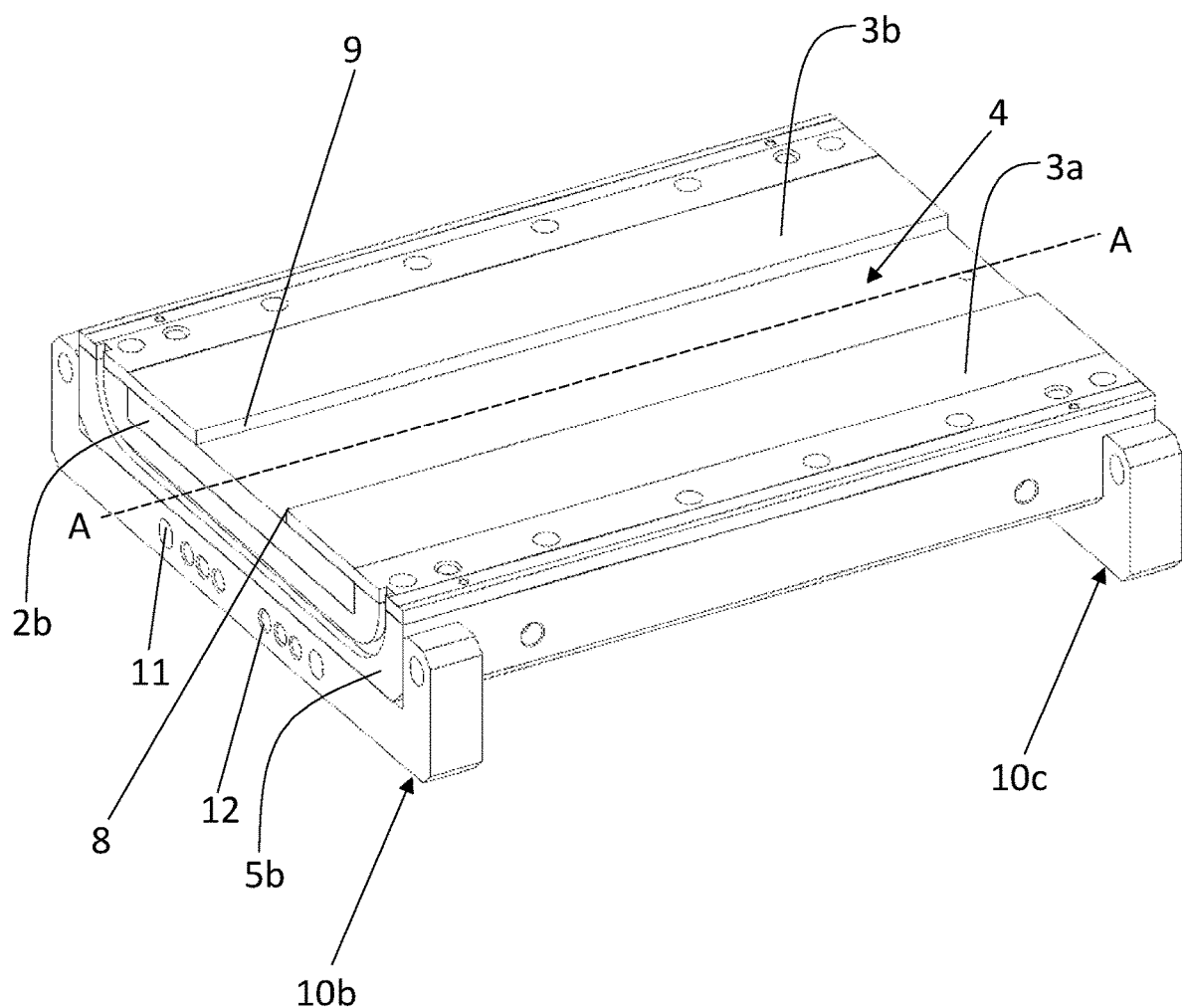
FIG. 11 illustrates a half of the heat exchanger module of FIG. 1, where the channel has a constant cross-section, in a perspective view.

Thus, the channel 4 has a constant cross-section from the inlet IN to the outlet OUT. This is visible for example in FIG. 11.

The width of the channel 4 may be easily adapted by changing the distance of the inner surfaces 8, 9 of the spacing elements 3a, 3b.

The height of the channel 4 may be easily adapted by changing the thickness of the spacing elements 3a, 3b.

Figure 5:
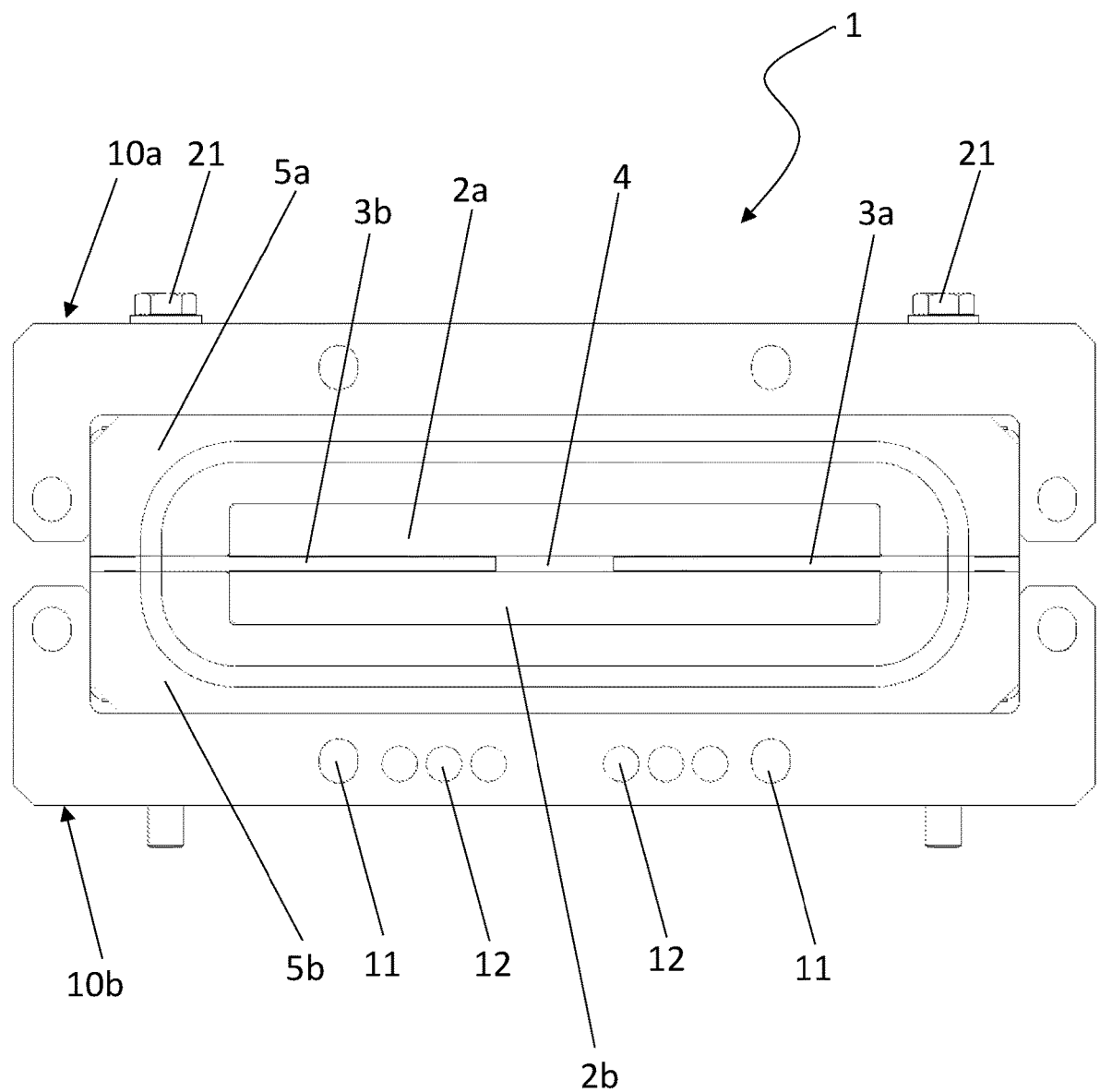
FIGS. 5, 6, 7 and 8 illustrate different embodiments of the heat exchanger module of FIG. 1 (corresponding to different shapes of channel), in a transverse cross-section.
Figure 6:
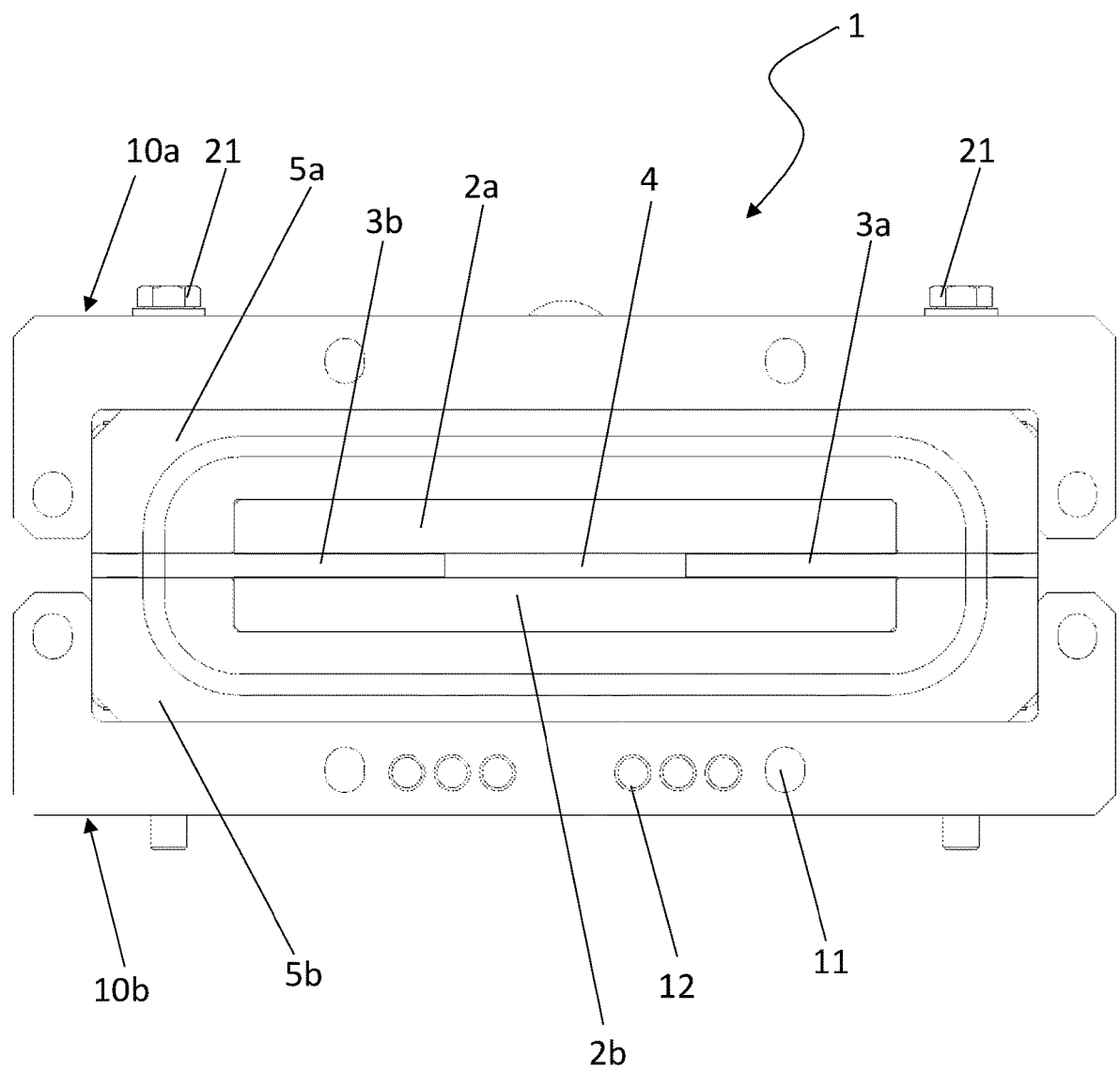
Figure 7:
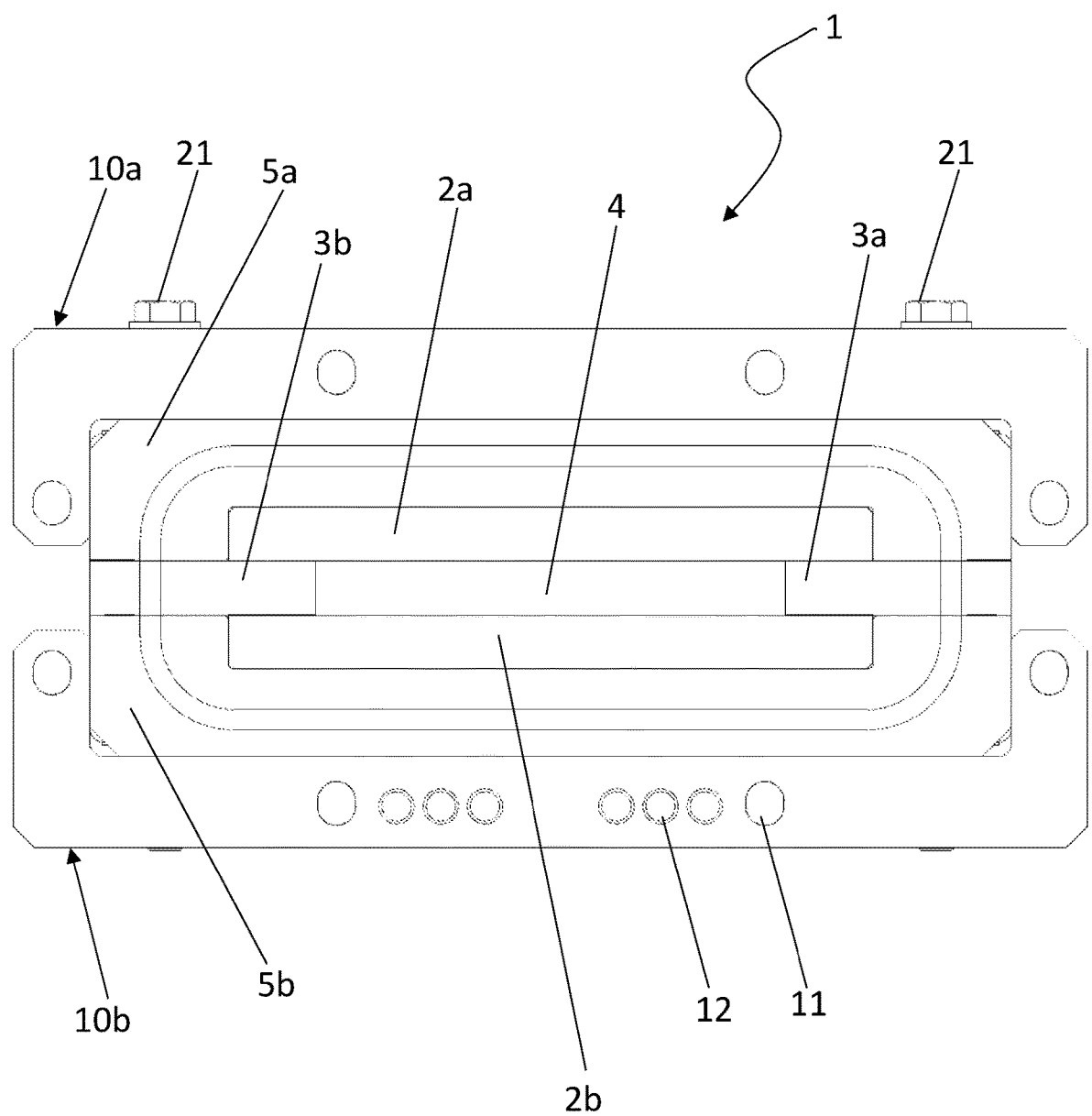

Different dimensions for the channel 4 with a constant cross-section are shown in FIGS. 5 to 7.

Figure 8:
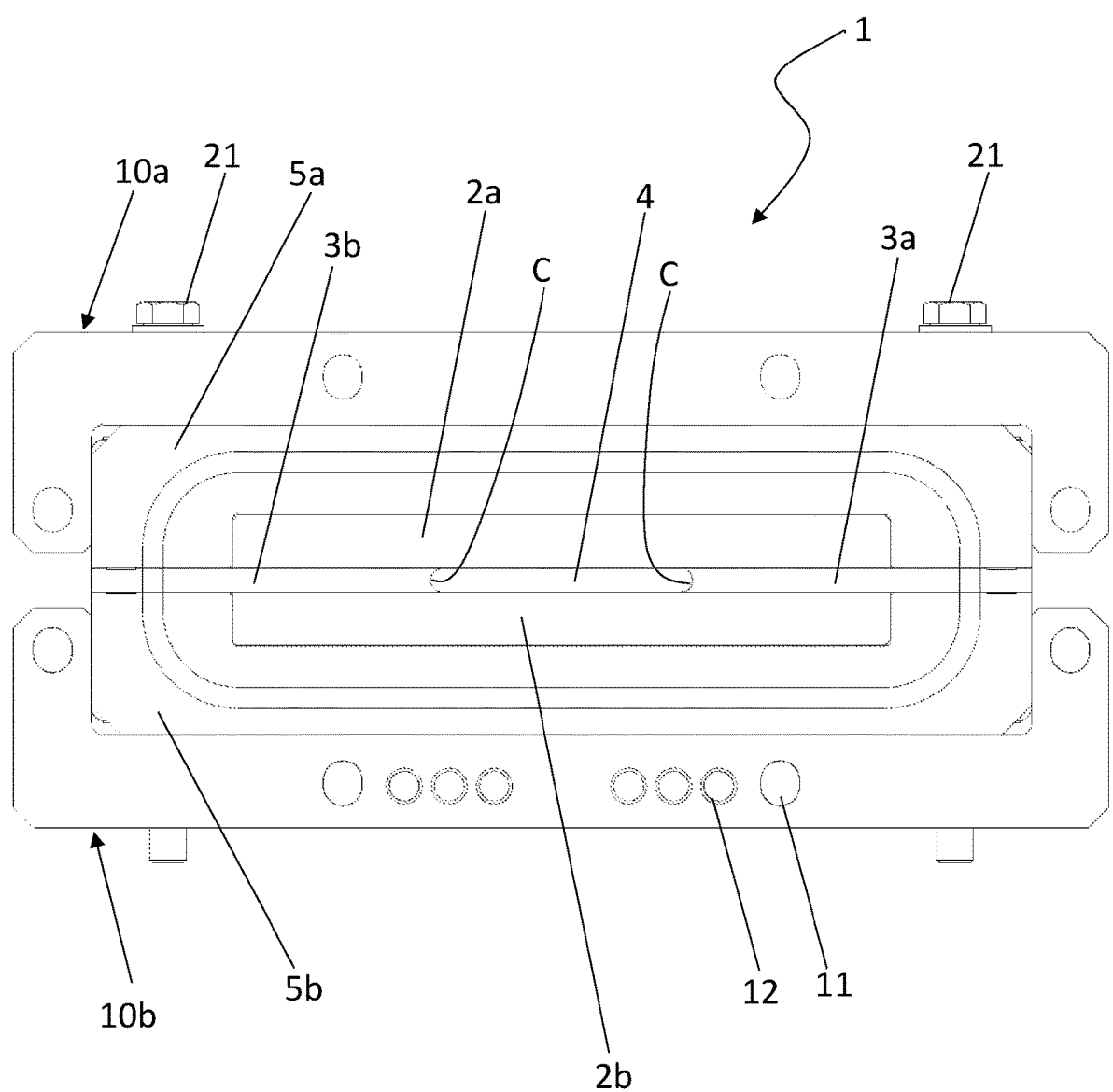

According to another embodiment of the invention, illustrated in FIG. 8, the inner surface 8 of the right spacing element 3a and the inner surface 9 of the left spacing element 3b have a concavity C that extends along their development following the longitudinal development of the channel 4.

Also in this embodiment, the channel 4 has a constant cross-section from the inlet IN to the outlet OUT.

According to another embodiment of the invention (not illustrated), the inner surface 8 of the right spacing element 3a and the inner surface 9 of the left spacing element 3b have a polygonal cross-section that extends along their development following the longitudinal development of the channel 4.

The width of the channel 4 may be easily adapted by changing the distance of the inner surfaces 8, 9 of the spacing elements 3a, 3b.

The height of the channel 4 may be easily adapted by changing the thickness of the spacing elements 3a, 3b.

Figure 9:
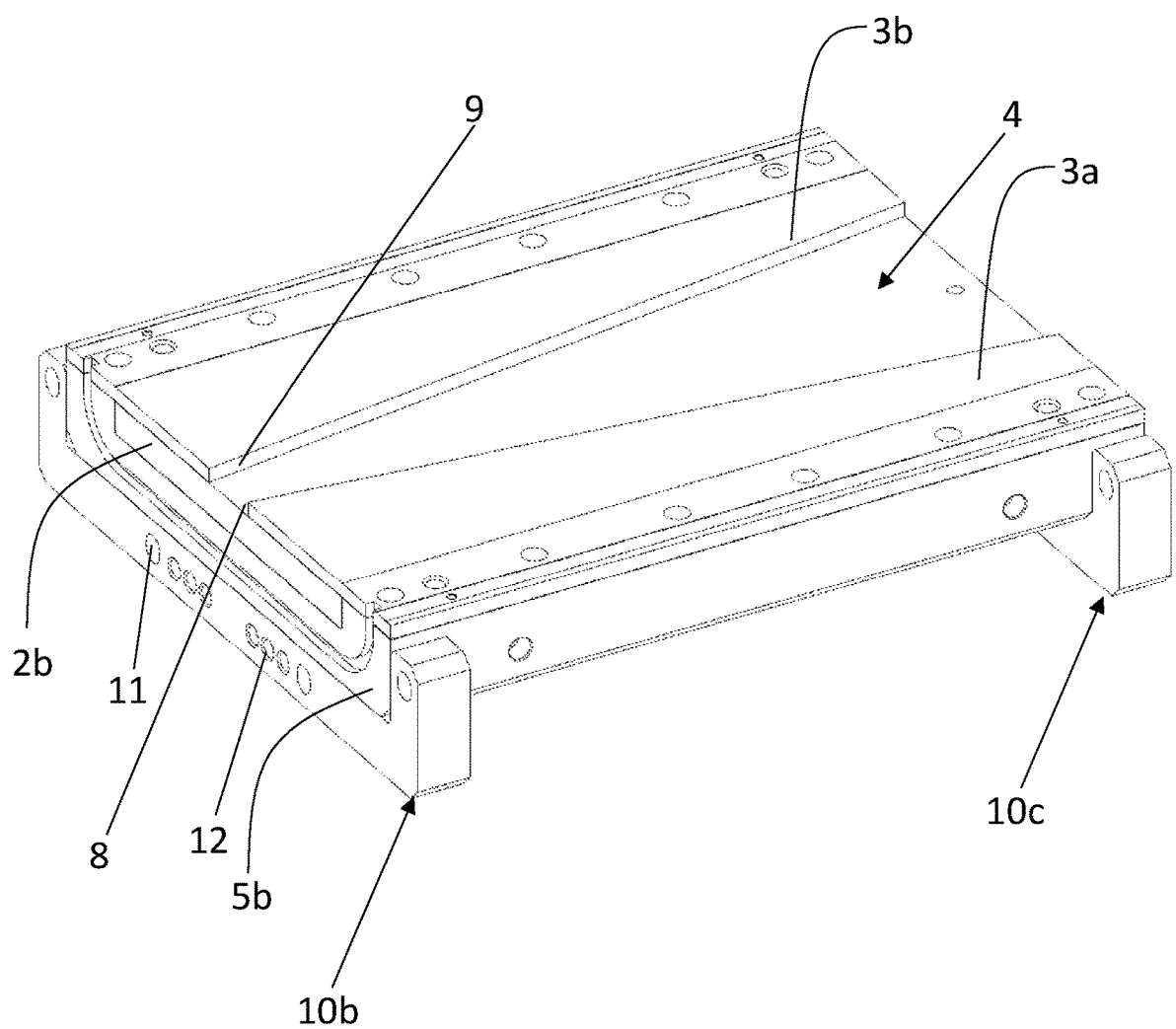
FIG. 9 illustrates a half of the heat exchanger module of FIG. 1, where the channel has a tapering development, in a perspective view.
Figure 10:
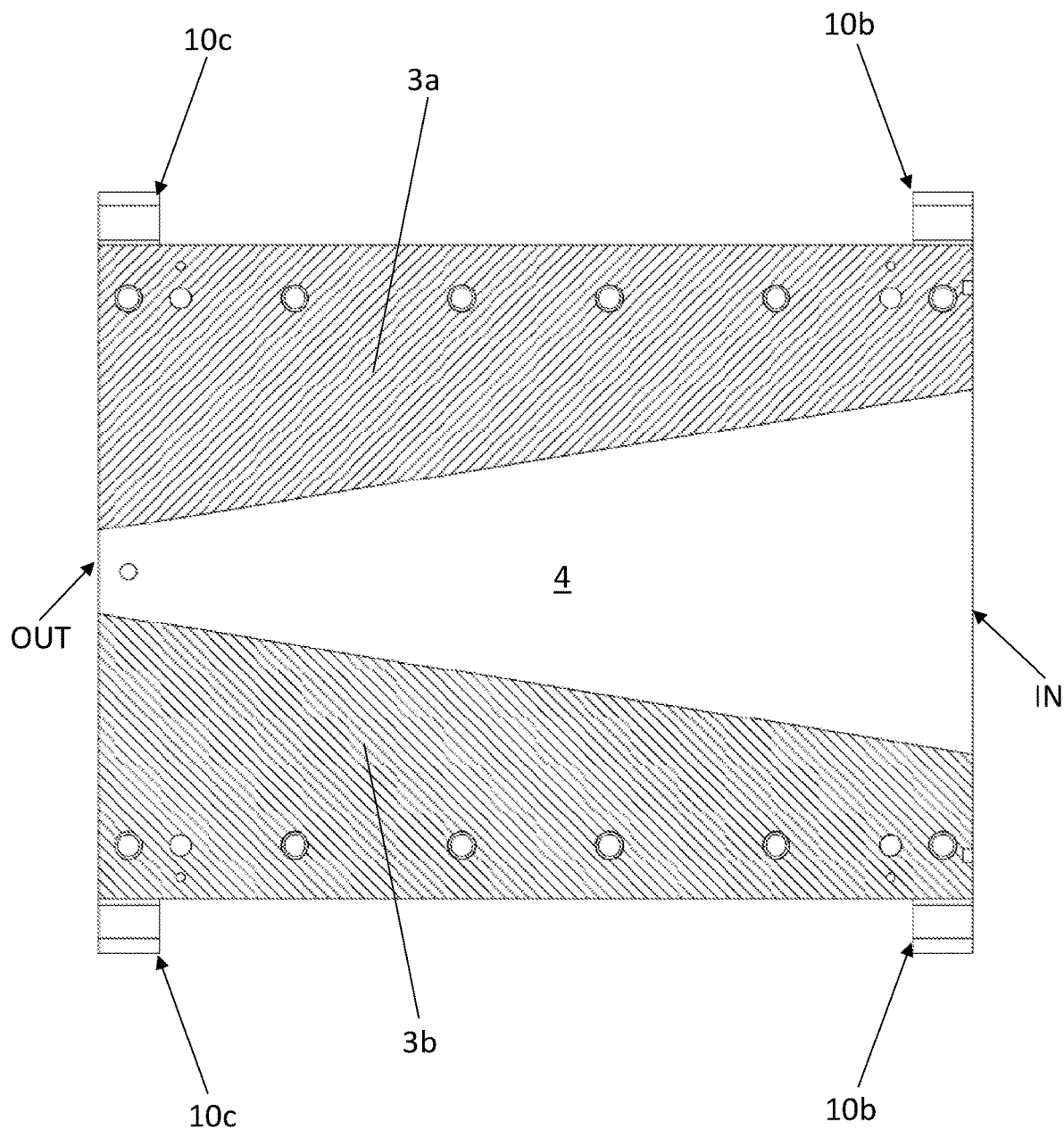
FIG. 10 illustrates the half of the heat exchanger module of FIG. 9, in a plane view.

According to another embodiment of the invention, illustrated in FIGS. 9-10, the inner surface 8 of the right spacing element 3a and the inner surface 9 of the left spacing element 3b are diverging with respect to each other so that the channel 4 has a tapered development from the inlet IN to the outlet OUT.

The channel 4 can be shaped by changing the angle of inclination of the inner surfaces 8, 9 of the spacing elements 3a, 3b. For example, the tapering of the channel 4 may be designed as sharper or more gradual.

In addition, the height of the channel 4 may be adapted by changing the thickness of the spacing elements 3a, 3b.

According to another embodiment of the invention, the inner surface 8 of the right spacing element 3a and the inner surface 9 of the left spacing element 3b are diverging with respect to each other so that the channel 4 has a tapered development from the outlet OUT to the inlet IN.

According to alternative embodiments, the two spacing elements 3a, 3b are different, either in shape or dimensions.

Here are listed some examples, that are not limitative and may be also combined.

In one example, the inner surfaces 8, 9 may be different in shape.

In one example, the width of the spacing elements 3a, 3b may change along the longitudinal development of the channel 4.

The spacing elements 3a, 3b can also have a different shape at the inlet IN and outlet OUT.

Originally, the heat exchanger module 1 comprises at least one passage P for a heat transfer fluid. The passage P is defined in a pocket 15 between one of the plates 2a, 2b and the corresponding concave shell 5a, 5b.

The passage P is defined by one or more diverters 18 arranged within the pocket 15.

A diverter 18 is an element that diverts, i.e., deflects, the direction of the fluid flow.

The heat transfer fluid may be a refrigerating fluid or a heating fluid, depending on the specific application. In fact, the heat exchanger module 1 may be used to cool down or heat up the fluid product flowing in the channel 4.

Any suitable heat transfer fluid (e.g., liquid or gas) at any desired temperature may be used for cooling or heating.

According to the embodiments illustrated here, the pocket 15 is obtained in one of the plates 2a, 2b.

In the illustrated embodiments, in each plate 2a, 2b there is obtained a corresponding passage P for a heat transfer fluid in a corresponding pocket 15.

Each plate 2a, 2b has an outer surface 16, 17 facing to the corresponding concave shell 5a, 5b. The outer surface 16, 17 has an inward recess that originates the pocket 15 facing the corresponding concave shell 5a, 5b.

The pocket 15 has one or more protrusions 18 emerging from the outer surface 16, 17 so as to define the passage P. The protrusions 18 are a type of diverters.

Preferably, the one or more protrusions 18 are inserted in the pocket 15 and fixed to the outer surface 16, 17 of the corresponding plate 2a, 2b.

According to other embodiments (not illustrated), the pocket 15 is obtained in one of the concave shells 5a, 5b, and preferably in both the concave shells 5a, 5b.

Similar configurations to the ones described above for the plates 2a, 2b can also be envisaged for the concave shells 5a, 5b.

Changing the shape, dimensions, and arrangement of the protrusions 18 in the pocket 15 allows to obtain different passages P for the heat transfer fluid, responding to different cooling/heating requirements.

Figure 13:
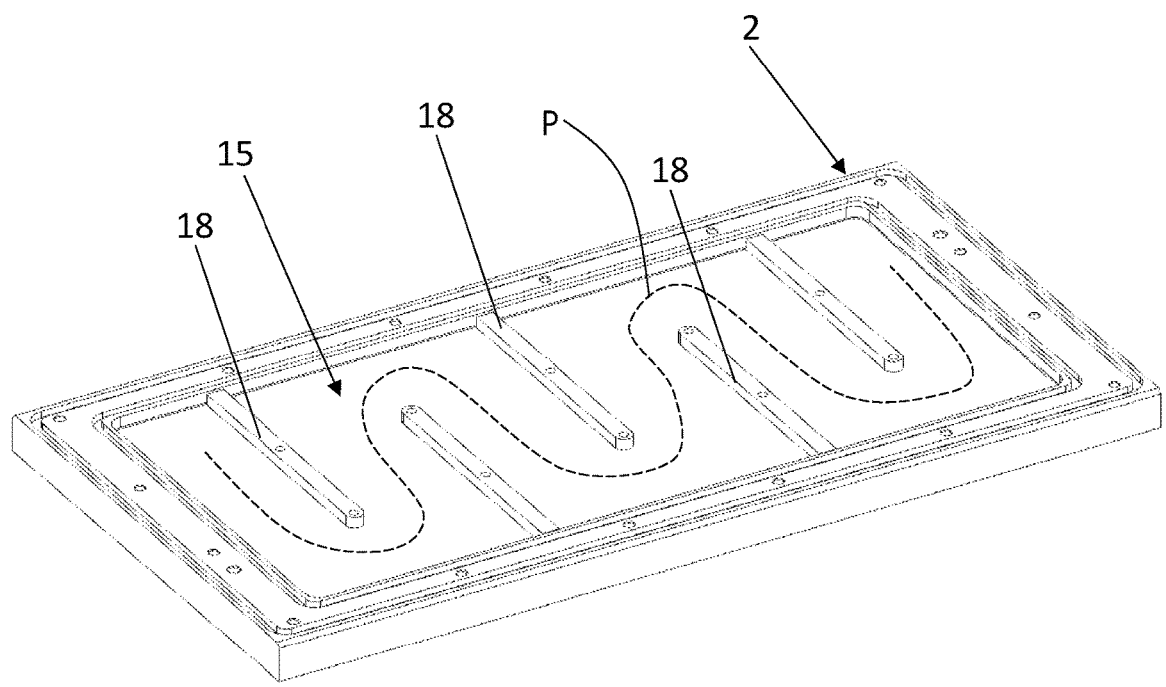
FIG. 13 illustrates another embodiment of a plate of FIG. 12.

In accordance with one embodiment of the invention, illustrated in FIG. 13, the protrusions 18 have a substantially linear development.

In particular, the protrusions 18 are rods.

In particular, the protrusions 18 are mutually parallel and staggered across the pocket 15.

Considering that channel 4 mainly develops along a longitudinal axis A-A, the protrusions 18 are arranged transversally to the longitudinal axis A-A of the channel 4.

For example, the protrusions 18 are orthogonal to the longitudinal axis A-A of the channel 4.

According to a variant (not illustrated), the protrusions 18 are mutually parallel, staggered across the pocket 15 and inclined of an angle different from 90° with respect to the longitudinal axis A-A of the channel 4.

According to another variant, the protrusions 18 are organized in two groups, where the protrusions 18 of each group are mutually parallel but are inclined to the protrusions 18 of the other group.

According to another embodiment, each protrusion 18 may have a development chosen among: substantially linear, curvilinear, polylinear.

In this context, a polyline is obtained by joining two or more lines.

The protrusions 18 may be identical or may even be different in shape, length, and overall dimensions.

For example, they define a passage P having a wavy development so as to increase turbulence in the heat transfer fluid.

For example, the passage P may have the form of a labyrinth, again for increasing turbulence.

Figure 12:
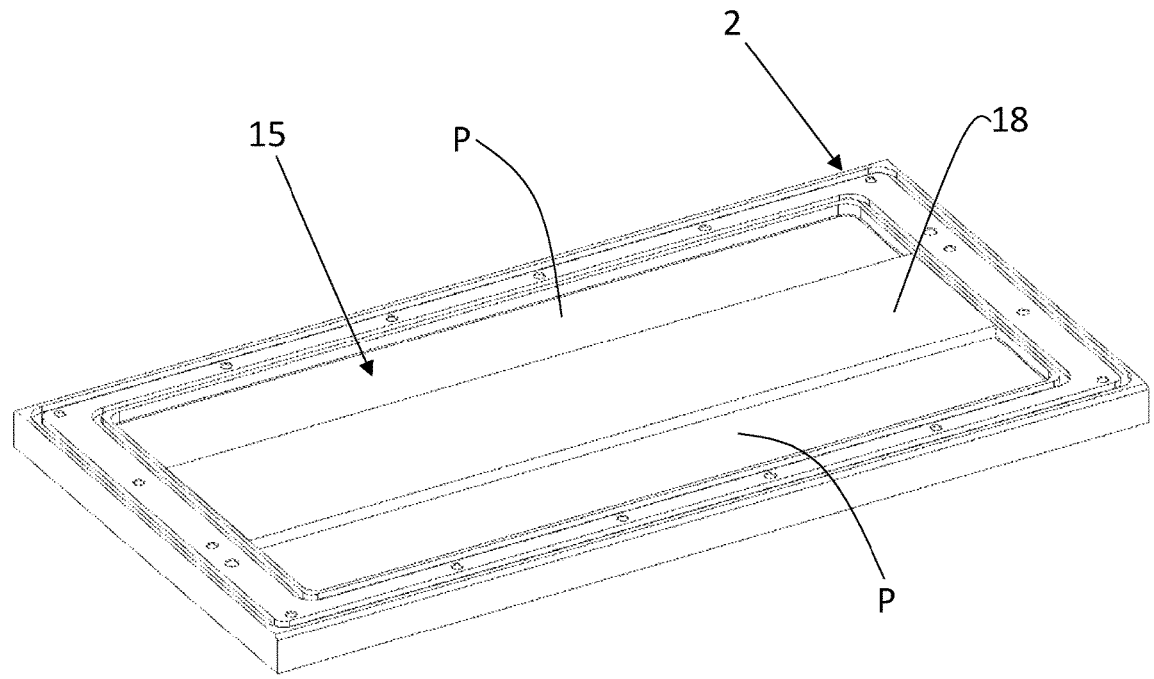
FIG. 12 illustrates an embodiment of a plate of the heat exchanger module of FIG. 1, in a perspective view.

In accordance with another embodiment of the invention, illustrated in FIG. 12, the protrusion 18 is only one and develops along the whole length of the pocket 15 so as to create a separation between two distinct passages P for the heat transfer fluid.

In particular, the single protrusion 18 develops parallel to the longitudinal axis A-A of the channel 4.

Therefore, the are obtained two passages P that are parallel to each other and to the longitudinal axis A-A of the channel 4. The two passages P are indeed separated by the single protrusion 18.

Two passages P with such a linear development allows to establish different thermal conditions within the two passages P. For example, the lateral parts could be heated more than the central part, or vice versa.

In the embodiment of FIG. 12, the single protrusion 18 is located in a central position with respect to the pocket 15.

This results in the creation of two symmetrical passages P. For example, this is useful to create a homogeneous thermal transfer from the two passages P.

Alternatively, the single protrusion 18 can be arranged asymmetrically within the pocket 15 so that the thermal transfer is different for the two passages P. This results in concentrating the transfer of heat in one passage with respect to the other. Spots with different heat concentrations may be useful for some applications.

In another embodiment, not illustrated, there are more longitudinal parallel protrusions 18 defining more than two parallel passages P, which are also parallel to the longitudinal axis A-A.

According to another embodiment, there is only one passage P delimited by two protrusions 18 that develop along the whole length of the pocket 15. The two protrusions 18 may be linear or having another shape, such as curvilinear or polylinear.

According to alternative embodiments, the diverters 18 may be obtained directly in the outer surfaces 16, 17 of the plates 2a, 2a by shaping them appropriately.

As already said, in the preferred embodiments each plate 2a, 2b has at least one passage P. The two plates 2a, 2b may also have different configurations for the passages P.

For example, the upper plate 2a has a wavy or labyrinth configuration of the passage P, whereas the lower plate 2b has a single protrusion 18 with two parallel passages P.

The choice depends on the needs of cooling/heating required by the specific application.

Figure 14:
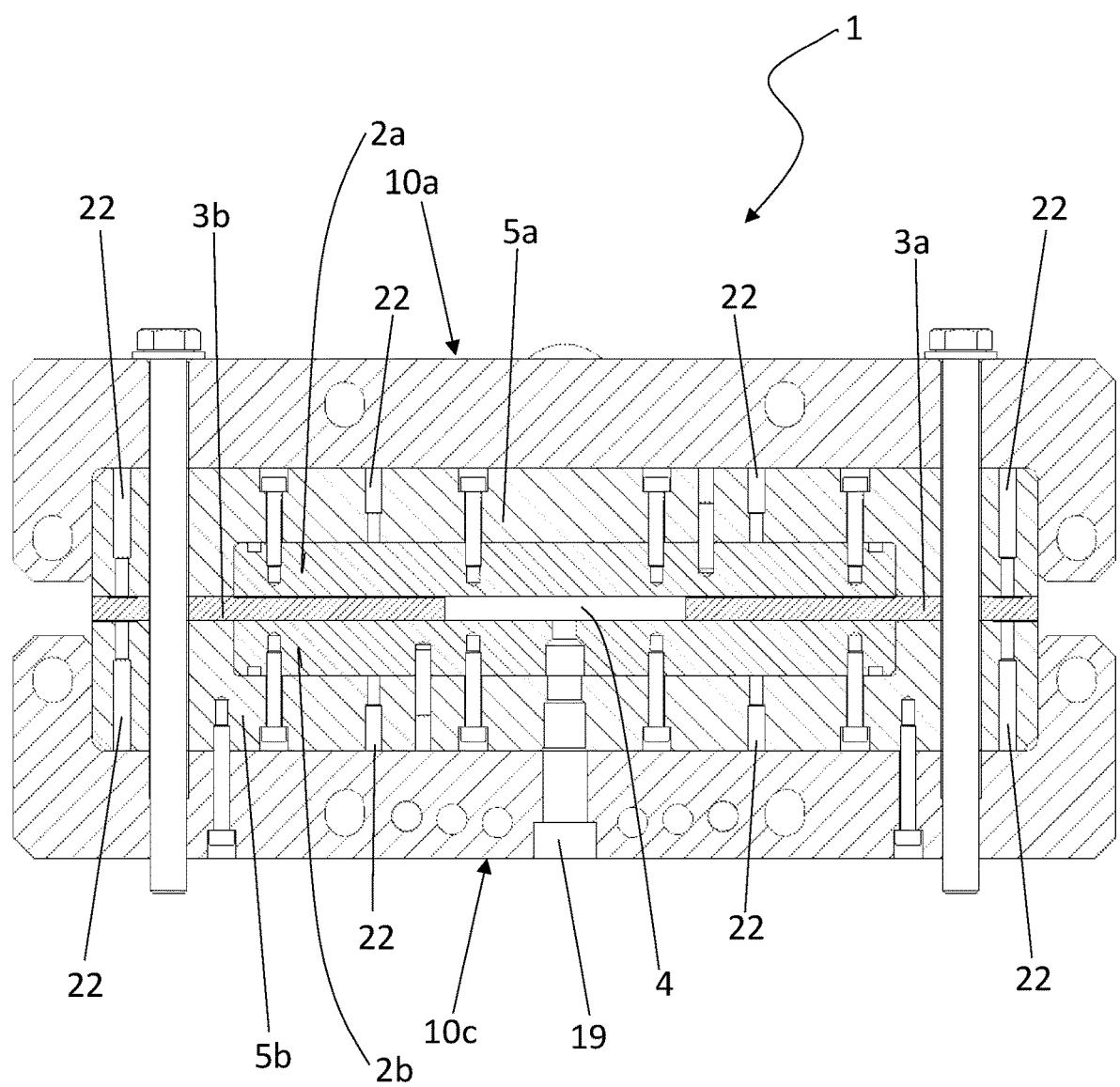
FIG. 14 illustrates another embodiment of the heat exchanger of FIG. 1 (with perforating gun and threaded holes), in a transverse cross-section.
Figure 15:
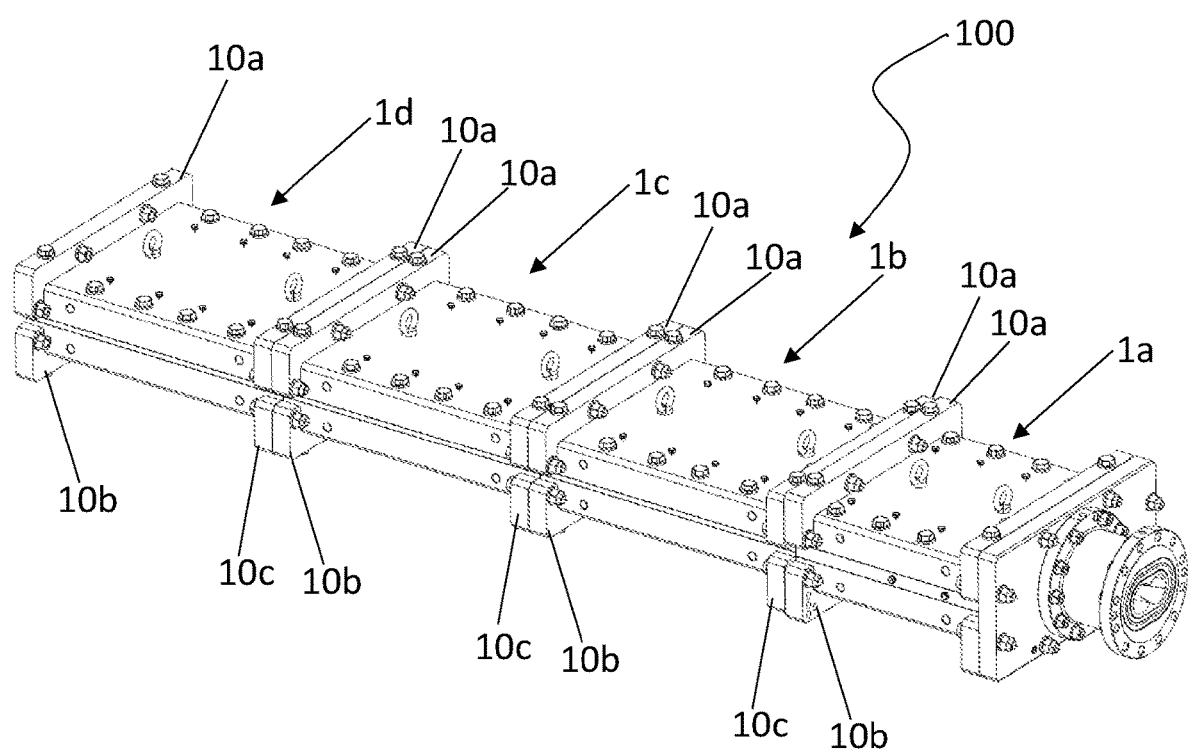
FIG. 15 illustrates a die comprising a plurality of heat exchanger modules of FIG. 1, in a perspective view.

According to one embodiment of the invention, shown in FIG. 14, the heat exchanger module 1 comprises a perforating gun 19 that is created so as to cross through a half of the module 1.

In particular, the perforating gun 19 starts at one flange 10a, 10b, crosses the concave shell 5a, 5b and the plate 2a, 2b and emerges into the channel 4.

The perforating gun 19 may be used to collect samples of fluid product flowing in the channel 4.

Alternatively, or in addition, the perforating gun 19 houses one or more sensors configured to detect physical properties (e.g., temperature or pressure) of the fluid product flowing in the channel 4.

The collection of samples or measured parameters is particularly useful for monitoring the heat transfer process. In fact, the data can be archived, processed, and used to set the process parameters according to a feedback loop, i.e., setting temperature, pressure or even modifying the recipes.

The perforating gun 19 can also be used to introduce specific additives or gases to the fluid product flowing in the channel 4.

The perforating gun 19 may also serve as a discharge pipe.

For example, the perforating gun 19 can also constitute a via for introducing a safety device for limiting the maximum pressure of the fluid product within the channel 4.

According to one aspect of the invention, the heat exchanger module 1 comprises a plurality of threaded holes 22. These are shown in FIG. 14.

The threaded holes 22 are left free during the normal operation of the heat exchanger module 1.

When it is necessary to dismantle the module 1 or part of it, the threaded holes 22 are used for allowing the insertion of screws or other tools, so helping to disassemble the module 1. This is useful especially where the components tend to stick together due to solidification of the fluid product in some areas.

With reference to the figures, number 100 indicates a die, in particular for edible products either for animals or for humans.

The die 100 comprises a plurality of heat exchanger modules 1a, 1b, 1c, 1d connected in series so that their channels 4a, 4b, 4c, 4d are in fluid communication.

Each module 1 may be identical or different from the others in terms of dimensions and shapes of the channels 4a, 4b, 4c, 4d, configuration of the passages P and plates 2a, 2b.

Figure 16:
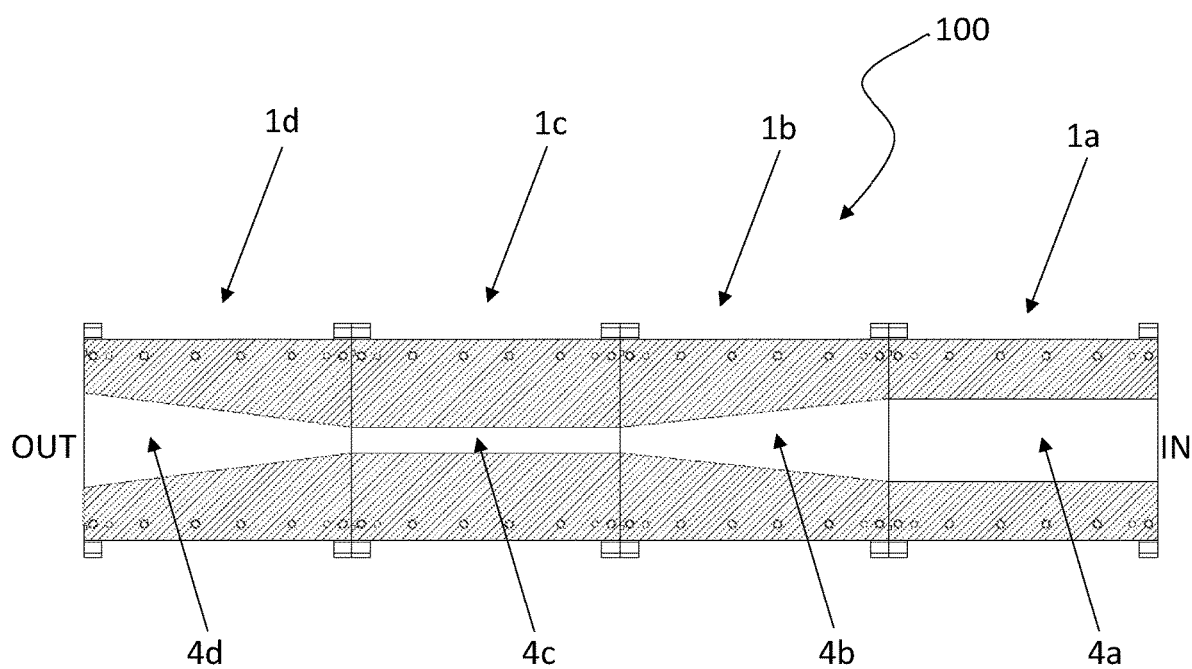
FIG. 16 illustrates the die of FIG. 15, in a longitudinal cross-section, according to an embodiment.

For example, in FIG. 16 there are shown four modules 1a, 1b, 1c, 1d arranged in series, where the channels 4 are as follows: a first tapered channel 4a, a second channel 4b with a constant cross-section, a third tapered channel 4c according to an opposite tapering direction with respect to the first tapered channel 4a, and fourth channel 4d with a constant cross-section that is wider than the second channel 4b.

The channels 4a, 4b, 4c, 4d are arranged in series, one after the other and are in fluid communication.

The number and length of the modules 1 is chosen depending on the specific application and final product to be obtained.

The modules 1 area connected together by means of the flanges 10a, 10b, as was described above.

According to another embodiment (not illustrated), the die 100 is composed by two or more lines, each comprising a series of modules 1.

The lines work in parallel, being fed by the same source of fluid product.

In this configuration, it is possible to obtain different final products (e.g., having different textures or even different recipes) starting from the same original fluid product.

The proposed die 100 may be employed in a plant for producing edible snacks for animals or humans. In particular, the die 100 can be arranged downstream extruding or pumping unit so as to receive the fluid product to be treated.

The characteristics and the advantages of a heat exchanger module and a die comprising a plurality of modules, according to the present invention, are clear, as are the advantages.

In particular, it is possible to control the heat transfer by changing the design of the passage for the heat transfer fluid. In fact, the passage can have a different shape and length depending on the shape, dimensions, and arrangement of the protrusions (diverters) in the pocket.

This way of adjusting the heat transmission within a pocket is a compact solution, that avoids increasing the overall bulk of the module.

The solution can be easily adapted to the needs of the specific application. In addition, the geometry of the channel may be easily adjusted acting on the spacing elements. This allows to adjust the thickness, width, and shape of the final products. In addition, the length of the channel may be varied by acting on the length of the whole module, or even by arranging in series a plurality of modules so as to obtain a channel that is composed by joining the channels of the modules.

Furthermore, the arrangement of a perforating gun allows to inject gases or additives to the fluid product, thus increasing the types of final product that may be obtained. The perforating gun also allows to collect samples of fluid product flowing in the channel or may house sensors for detecting physical properties of the fluid product.

The heat exchanger module is easily dismantlable, thus allowing an easier cleaning and maintenance with respect to known solutions.

The extreme versatility of the heat exchanger module here proposed allows to achieve a higher control in the production of meat analogs or other fluid products, resulting in a final product having higher quality.

The invention claimed is:

1. A heat exchanger module comprising:
   two plates that are arranged in parallel and spaced from each other by means of two spacing elements so as to define a channel for a passage of a fluid product, the channel being delimited by the two plates and the two spacing elements;
   two concave shells, each of said two plates being integrally fixed to one of the two concave shells,
   at least one passage for a heat transfer fluid, said passage being defined in a pocket between one of said two plates and a corresponding concave shell, said passage being defined by one or more diverters arranged within the pocket, wherein said pocket is obtained in one of the two plates that comprises an outer surface towards a respective concave shell, the outer surface having an inward recess that creates said pocket, the one or more diverters being protrusions emerging from the outer surface so as to define said passage.

2. The heat exchanger module according to claim 1, wherein said protrusions have a substantially linear development.

3. The heat exchanger module according to claim 1, wherein said protrusions are mutually parallel.

4. The heat exchanger module according to claim 1, wherein said protrusions are staggered across the pocket.

5. The heat exchanger module according to claim 1, wherein the passage has a wavy development or labyrinth so as to increase turbulence in the heat transfer fluid.

6. The heat exchanger module according to claim 1, wherein each of said protrusions has a substantially linear development or a curvilinear development or a polylinear development.

7. The heat exchanger module according to claim 1, comprising two passages obtained in a same plate of the two plates and separated by a single protrusion developing along a whole length of the pocket.

8. The heat exchanger module according to claim 1, wherein the passage is only one and is delimited by two protrusions developing along a whole length of the pocket.

9. The heat exchanger module according to claim 1, wherein each of said two plates has the at least one passage for the heat transfer fluid.

10. The heat exchanger module according to claim 9, wherein passages of said two plates are identical or different.

11. The heat exchanger module according to claim 1, wherein said two spacing elements have corresponding inner surfaces delimiting the channel, the corresponding inner surfaces of the two spacing elements being plane and mutually parallel.

12. The heat exchanger module according to claim 1, wherein said two spacing elements have corresponding inner surfaces delimiting the channel, the corresponding inner surfaces of the two spacing elements having a concavity that extends along their development following a development of the channel.

13. The heat exchanger module according to claim 1, wherein said two spacing elements have corresponding inner surfaces delimiting the channel, the corresponding inner surfaces of the two spacing elements being diverging with respect to each other so that the channel has a tapered development from an inlet to an outlet.

14. The heat exchanger module according to claim 1, further comprising a perforating gun that is created so as to cross a half of the heat exchanger module and emerge into the channel.

15. The heat exchanger module according to claim 1, further comprising a plurality of threaded holes for allowing insertion of screws or other tools in disassembling the heat exchanger module.

16. The heat exchanger module according to claim 1, further comprising a plurality of flanges that are applied externally to the two concave shells and integrally fixed thereto.

17. A die for edible products for animals or humans, comprising a plurality of heat exchanger modules according to claim 16, said plurality of heat exchanger modules being connected in series so that their channels are in fluid communication.

18. The die according to claim 17, wherein flanges of adjacent modules are connected together.

19. The die according to claim 17, wherein each of the channels is tapered or with a constant-cross section.

* * * * *

UNITED STATES PATENT AND TRADEMARK OFFICE
CERTIFICATE OF CORRECTION

| | | |
|---|---|---|
| PATENT NO. | : 12,163,742 B2 | Page 1 of 1 |
| APPLICATION NO. | : 18/696706 | |
| DATED | : December 10, 2024 | |
| INVENTOR(S) | : Massimo Lenti et al. | |

It is certified that error appears in the above-identified patent and that said Letters Patent is hereby corrected as shown below:

On the Title Page

Item (57), Abstract, Line 13, delete "(Sa, 5b)," and insert -- (5a, 5b), --, therefor.

Signed and Sealed this
Sixth Day of May, 2025

Coke Morgan Stewart
*Acting Director of the United States Patent and Trademark Office*